United States Patent [19]

Sugioka et al.

[11] 4,333,362

[45] Jun. 8, 1982

[54] SPEED-SHIFT APPARATUS FOR SHEET WINCH

[75] Inventors: Masumi Sugioka, Shimada; Norihiro Ogawa, Shizuoka, both of Japan

[73] Assignee: Asahi Malleble Iron Co., Ltd., Shizuoka, Japan

[21] Appl. No.: 152,882

[22] Filed: May 23, 1980

[30] Foreign Application Priority Data

May 31, 1979 [JP] Japan ................................ 54-67898

[51] Int. Cl.[3] ................................................ F16H 5/52

[52] U.S. Cl. ........................................ 74/812; 74/810; 254/308; 254/354

[58] Field of Search .................. 254/308, 354; 74/810, 74/812

[56] References Cited

U.S. PATENT DOCUMENTS

| | | | |
|---|---|---|---|
| Re. 30,423 | 10/1980 | Hutton et al. | 74/812 X |
| 2,687,658 | 8/1954 | Nelson et al. | 74/812 |
| 3,670,589 | 6/1972 | Carter | 254/354 X |
| 3,711,065 | 1/1973 | Lawrence | 74/812 X |
| 3,728,914 | 4/1973 | Guagorena et al. | 74/812 |
| 3,802,665 | 4/1974 | Fawcett | 74/812 |
| 3,809,368 | 5/1974 | Lawrence | 74/812 |
| 3,962,935 | 6/1976 | Hutton et al. | 74/812 |
| 3,973,755 | 8/1976 | Fawcett | 74/812 X |
| 4,120,486 | 10/1978 | Mehnet | 74/812 |
| 4,240,309 | 12/1980 | Tyler | 74/812 X |

*Primary Examiner*—Leslie Braun
*Attorney, Agent, or Firm*—Ladas & Parry

[57] ABSTRACT

The disclosed speed-shift apparatus is for a sheet winch with a drum rotatably mounted on a base and can effect the shift of the speed-change ratio and the winch winding by one hand. A one-way transmission means having pawls and pawl-engaging grooves is provided between an input shaft and the winch drum. An interrupting member is rotatably carried by the base so as to selectively disengage said pawls from said pawl-engaging grooves and the interrupting means also has grooves for engaging said pawls.

5 Claims, 11 Drawing Figures

SPEED-SHIFT APPARATUS FOR SHEET WINCH

BACKGROUND OF THE INVENTION

1. Field of the Invention

This invention relates to a speed-shift apparatus for a manual sheet winch for marine use, especially for a manual marine sheet winch with a multi-staged speed change mechanism.

2. Description of the Prior Art

Different type sheet winches with speed-change mechanisms, for instance, three-staged speed-change mechanisms, have been used heretofore.

One of the conventional constructions of the sheet winch comprises two sets of gear trains with high reduction ratios, one set of gear train with a reduction ratio close to direct driving, and a speed-shift means, e.g., a clutch, for selecting the desired one of the gear trains.

This type winch construction has a drawback in that, when operation of the speed-shift means is necessary, a shift lever separate from a driving handle must be actuated, so that it is impossible to actuate both the handle and the lever by only one hand. Sheet winches for yacht and the like vessels are generally required to be operable by only one hand, because one hand is continuously occupied by a rope for handling the vessel, and the other hand is only available for operating the sheet winch. Accordingly, the sheet winch of the aforesaid conventional construction has a shortcoming in that the hand for operating the driving handle of the winch has to be moved to the speed-shift lever for shifting the speed-change ratio.

Another construction of the sheet winch in the prior art uses a speed-shift disk coacting with a ratchet wheel engageable with pawls, instead of using the speed-shift lever actuating a clutch or the like. However, this speedshift disk also requires the simultaneous use of two hands for the sheet winch, e.g., for simultaneous operations of the driving handle and the speed-shift disk. Thus, complete operation of the sheet winch by only one hand is not possible yet.

In another construction of the sheet winch in the prior art, a connecting means for connecting the driving handle to the drum of the sheet winch is mounted on the driving handle itself, so that the connection between the driving handle and the drum can be regulated by the connecting means on the driving handle. With this construction using the connecting means, however, the construction of the driving handle becomes special and such driving handle cannot be used in common for winches of other types.

SUMMARY OF THE INVENTION

Therefore, an object of the present invention is to obviate the aforesaid drawbacks and the shortcomings of the prior art, by providing a novel speed-shift apparatus of sheet winch in which all the speed-change operations can be carried out by one hand alone.

Another object of the present invention is to provide a speed-shift apparatus of simplified construction, so as to facilitate the reduction of the size and weight of the sheet winch.

A further object of the present invention is to provide an improved speed-shift apparatus for sheet winch which does not require any special handle, so as to facilitate the use of handles of one kind in various winches.

To fulfill the aforesaid objects, a speed-shift apparatus for a sheet winch with multiple speed-change ratios according to the present invention comprises a one-way rotation transmitting mechanism having a pawl means and a pawl-engaging groove means, said transmitting mechanism being disposed between an input shaft and a winch drum of said sheet winch, an interrupting member rotatable relative to said input shaft, said interrupting member having pawl-engaging portions and being adapted to partially interrupt a space between said pawl means and a member having said pawl-engaging groove means, and a mechanism allowing one-way rotation of said interrupting member relative to a base of said sheet winch.

BRIEF DESCRIPTION OF THE DRAWINGS

For a better understanding of the invention, reference is made to the accompanying drawings, in which.

Like parts are designated by like numerals and symbols throughout different views of the drawing.

DESCRIPTION OF THE PREFERRED EMBODIMENT

Figure 1:
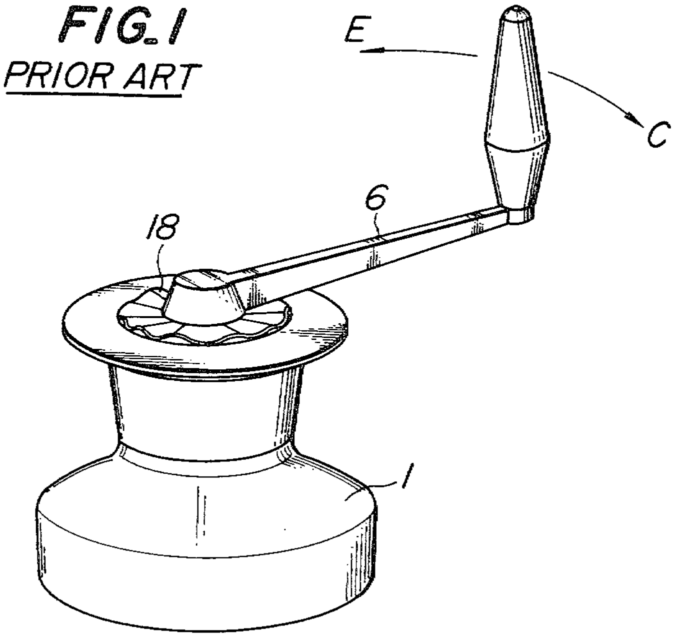
FIG. 1 PRIOR ART
FIG. 1 is a schematic perspective view of a sheet winch of the prior art.
Figure 2:
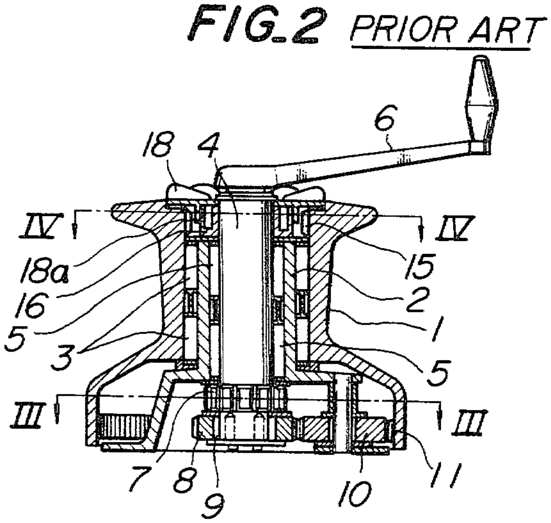
FIG. 2 PRIOR ART
FIG. 2 is a vertical sectional view of the sheet winch of FIG. 1.

Before entering the details of the apparatus of the invention, a typical sheet winch of the prior art will be reviewed by referring to FIG. 1 through FIG. 4. The illustrated sheet winch of the prior art has a drum 1 rotatably supported by a base 2. Bearing rollers 3 are disposed between the drum 1 and the base 2. An input shaft 4 rotatably fits in the central portion of a hollow bearing portion of the base 2 with bearing rollers 5 disposed therebetween, and a handle 6 drives the input shaft 4. A gear 7 is secured to a lower portion of the input shaft 4, and another gear 8 is operatively conected to the lower end of the input shaft 4 through a one-way clutch mechanism 9. A gear 10 meshes both the aforesaid gear 8 and an internal gear 11 formed on the inner peripheral surface of the lower end of the drum 1. An intermediate gear 12 meshes the aforesaid gear 7 on the input shaft. Another intermediate gear 13 is coaxially connected to the gear 12 through another one-way clutch mechanism 14, and this intermediate gear 13 meshes the gear 10. The drum 1 has a ratchet wheel 15 formed along the inner peripheral surface of the upper end thereof. The input shaft 4 has a ring 16 secured to the top end thereof, and pawls 17 are pivotally connected to the ring 16. A speedshifting disk 18 has arcuate pawl-interrupting members 18a integrally secured thereto.

Figure 4:
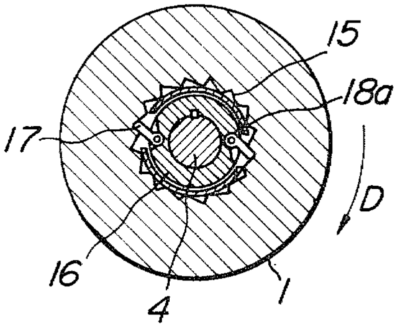
FIG. 4 PRIOR ART
FIG. 4 is a horizontal sectional view taken along the line IV—IV of FIG. 2.

In operating the illustrated apparatus of the prior art, if it is desired to rotate the drum 1 by directly connecting the handle 6 to the drum 1, the speed-shifting disk 18 is set a position as shown in FIG. 4, so that the pawls 17 engage the ratchet wheel 15. Thus, the handle 6 is turned in a direction of the arrow C of FIG. 1. As a result, the drum 1 is directly connected to the handle 6 and rotated by the handle 6 through the input shaft 4, the ring 16, the pawls 17, and the ratchet wheel 15 in a direction as shown by the arrow D of FIG. 4. In this case, the gears at the lower portion of the sheet winch also rotate, but the rotation of such gears do not disturb the rotation of the drum 1 because of the one-way clutch mechanisms 9 and 14.

Under this condition, if the handle 6 is turned in a direction of the arrow E of FIG. 1, the pawls 17 disengage from the ratchet wheel 15 of the drum 1. In this case, the rotation of the input shaft 4 is transmitted to the gear 8 through the one-way clutch mechanism 9, for rotating the gear 8 in a direction of the arrow F of FIG. 3. Consequently, the gear 10 rotates in a direction of the arrow G of FIG. 3, so that the drum 1 rotates in a direction of the arrow H of the figure at a reduced speed. In this case, the gears 7, 12, and 13 also rotate, but the one-way clutch mechanism 14 prevents such rotation of the gears from disturbing the aforesaid operation of the sheet winch.

To further reduce the rotation of the drum 1 per unit rotation of the handle, the speed-shifting disk 18 is turned relative to the input shaft 4, so as to cause the pawl-interrupting member 18a to encircle the pawls 17, and then the handle 6 is rotated in the direction of the arrow C of FIG. 1. Under such conditions, the input shaft 4 and the gear 7 rotate in a direction of the arrow I of FIG. 3, causing the gears 12 and 13 to rotate in a direction of the arrow J of the figure. As a result, the drum 1 is driven by the gear 13 through the gear 10 in the direction of the arrow H at a smaller speed-change ratio than that through the gear 8. In this case, the gear 8 rotates in the opposite direction to that of the input shaft 4, but such rotation of the gear 8 is absorbed by the one-way clutch mechanism 9.

To shift the small speed-change ratio to the large speed-change ratio, one can do the aforesaid operation in the reverse order.

It is apparent that one cannot perform all the speed-change operations of the conventional sheet winch illustrated in FIG. 1 through FIG. 4 by this one hand alone, because the speed-shifting disk 18 must be turned for certain speed shifts.

A modification has been proposed to provide a special joint mechanism between the handle 6 and the drum 1 for replacing the aforesaid direct connection between the input shaft 4 and drum 1, which joint mechanism allows selective making and breaking of the connection between the handle 6 and the drum 1 by operation of the joint mechanism. This modification, however, has a shortcoming in that the handle has to have a special construction, so that the handle cannot be used in common with other type winches.

Figure 3:
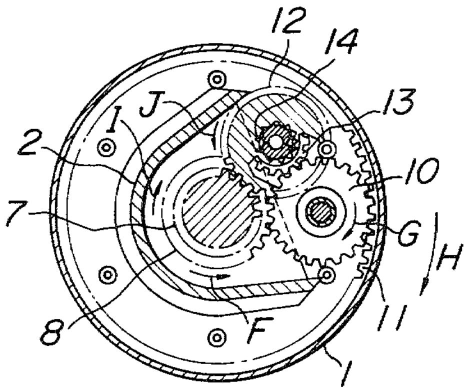
FIG. 3 PRIOR ART
FIG. 3 is a horizontal sectional view taken along the line III—III of FIG. 2.

A preferred embodiment of the present invention will be now explained by referring to FIG. 5 through FIG. 11, wherein those parts which are like the parts in FIG. 1 through FIG. 4 are designated by like numerals and like symbols except that the gear 10 of FIG. 3 is replaced with integrally formed gears 10a and 10b. The gear 10a meshes gears 8 and 13, while the gear 10b meshes the internal gear 11 of the drum 1.

Figure 5:
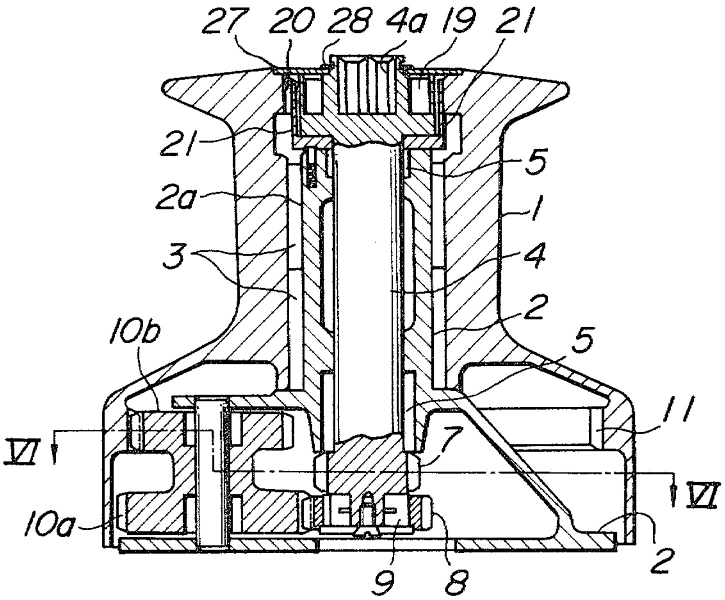
FIG. 5 is a vertical sectional view of a sheet winch having a speed-shift apparatus according to the present invention.
Figure 6:
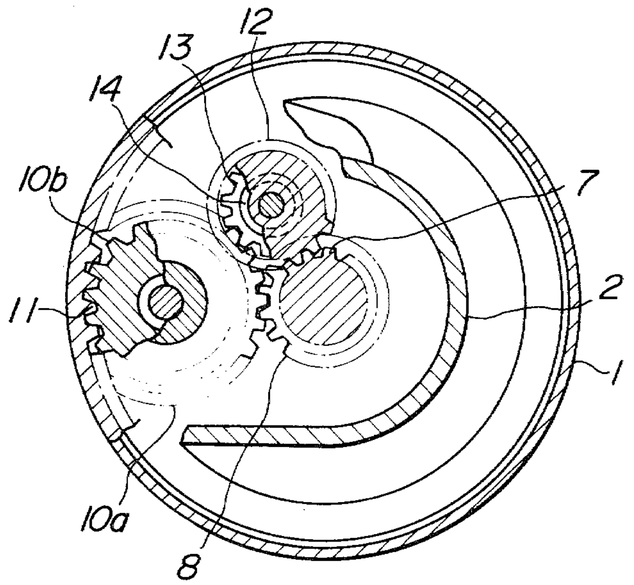
FIG. 6 is a horizontal sectional view taken along the line VI—VI of FIG. 5.
Figure 7:
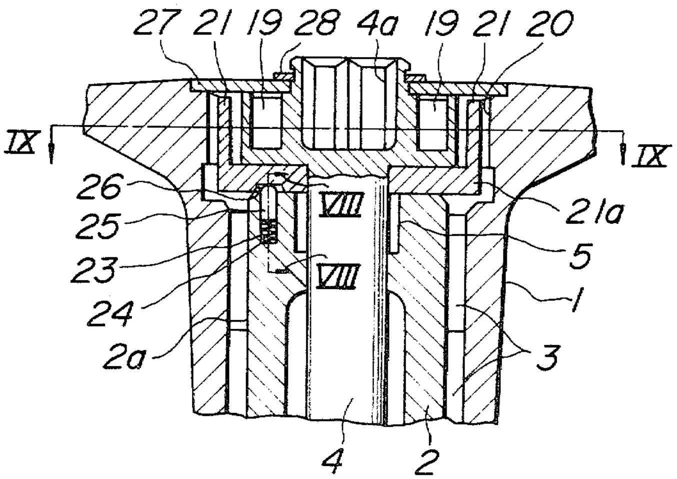
FIG. 7 is a detailed sectional view of an essential portion in the sheet winch of FIG. 5.
Figure 9:
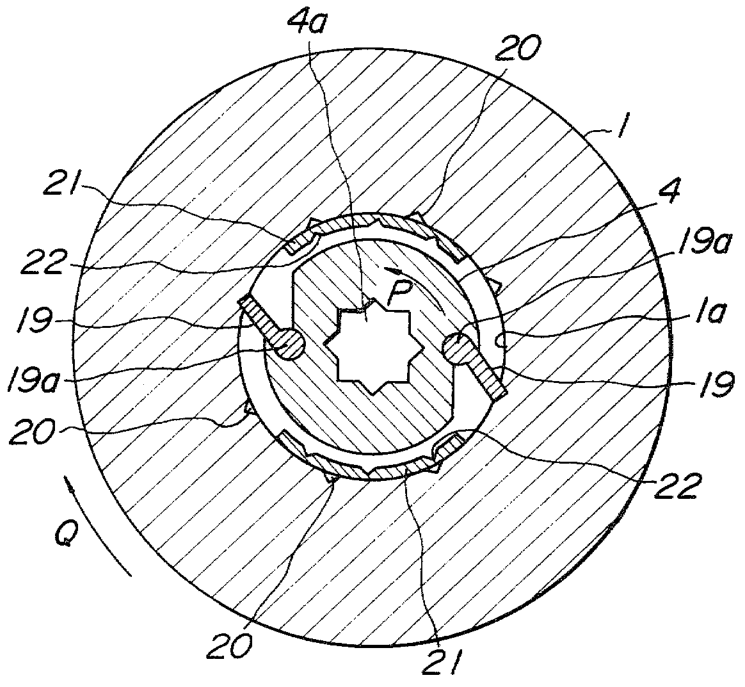
FIGS. 9 through 11 are horizontal sectional views taken along the line IX—IX of FIG. 7, illustrating the operation of the apparatus of the present invention.

In the embodiment of the invention, base portions 19a of pawls 19 are pivotally connected to the upper portion of the input shaft 4, as best shown in FIG. 9. A hole 1a is bored at the upper portion of the drum 1, and suitably spaced pawl-engaging grooves 20 are formed on the inner peripheral surface of the hole 1a so as to selectively receive the tip portions of the pawls 19 in the groove 20. Referring to FIGS. 5 and 7, arcuate interrupting members 21 with bottom portions 21a integrally formed therewith are disposed between the input shaft 4 and the inner peripheral surface of the hole 1a so as to be rotatable relative to the input shaft 4. The interrupting members 21 selectively interrupt the engagement of the tip ends of the pawls 19 with the pawl-engaging grooves 20. The inner peripheral surfaces of the arcuate interrupting members 21 have spaced pawl-engaging grooves 22 formed thereon for selectively receiving tip ends of the pawls 19. A mechanism is disposed between the interrupting member 21 and the base 2 of the sheet winch, so that the rotation of the interrupting member 21 in a direction of driving by the pawls 19 engaging the grooves 22 is allowed, but the rotation of the member 21 in the opposite direction is not allowed.

Figure 8:
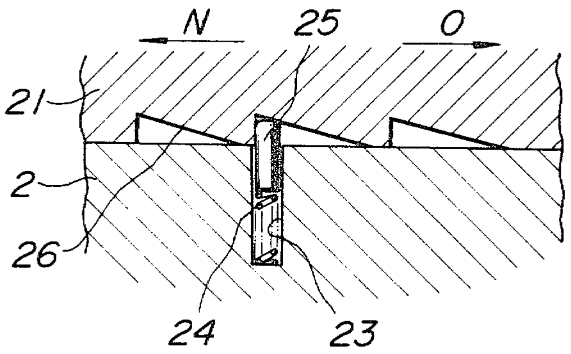
FIG. 8 is a partial sectional view taken along the line VIII—VIII of FIG. 7.

For instance, as shown in FIGS. 7 and 8, a hole 23 is bored on the top surface of the shaft-receiving cylindrical portion 2a of the base 2, and a coil spring 24 is fitted in the hole 23 for receiving a pin 25 on the spring 24 so as to be vertically movable. Sawteeth 26 are formed along a circle on the lower surface of the bottom portion 21a of the interrupting member 21 in such a manner that the projecting end of the pin 25 above the top surface of the cylindrical portion 2a engages the sawteeth. In the example of FIG. 8, the rotation of the interrupting member 21 in a direction of the arrow N is allowed, but the rotation in a direction of the arrow O is prevented. In the figures, 4a is a hole for receiving the handle 6 (not shown), 27 is a cover, and 28 is a snap ring.

Operation of the apparatus of the present invention with the aforesaid construction will be now explained. To directly connect the handle 6 (not shown) to the drum 1 for rotating the drum 1, the handle (not shown) connected to the input shaft 4 is turned in a direction of the arrow P of FIG. 9 or in a counter-clockwise direction. In this case, the interrupting member 21 does not rotate, and the input shaft 4 and the pawls 19 rotate together. Thus, as the tip ends of the pawls 19 come to the positions of the pawl-engaging grooves 20 formed on the hole 1a of the drum 1, the tip ends of the pawls 19 engage the pawl-engaging grooves 20 as shown in FIG. 9. It is noted here that the pawls 19 are normally biased by springs (not shown) or the like in a direction for engaging the pawl-engaging grooves 20.

Once the pawls 19 engage the pawl-engaging grooves 20, the handle 6 (not shown) is rotated in a clockwise direction (or a direction of the arrow Q). Then, the rotation of the input shaft 4 is directly transmitted to the drum 1 through the pawls 19, and the drum 1 rotate in the same direction as that of the handle 6 (not shown) under the condition of direct connection. In this case, the gears at the bottom portion of the sheet winch rotate, but the one-way clutch mechanisms 9 and 14 prevent such rotations of the gears from disturbing the rotation of the drum 1.

Figure 10:
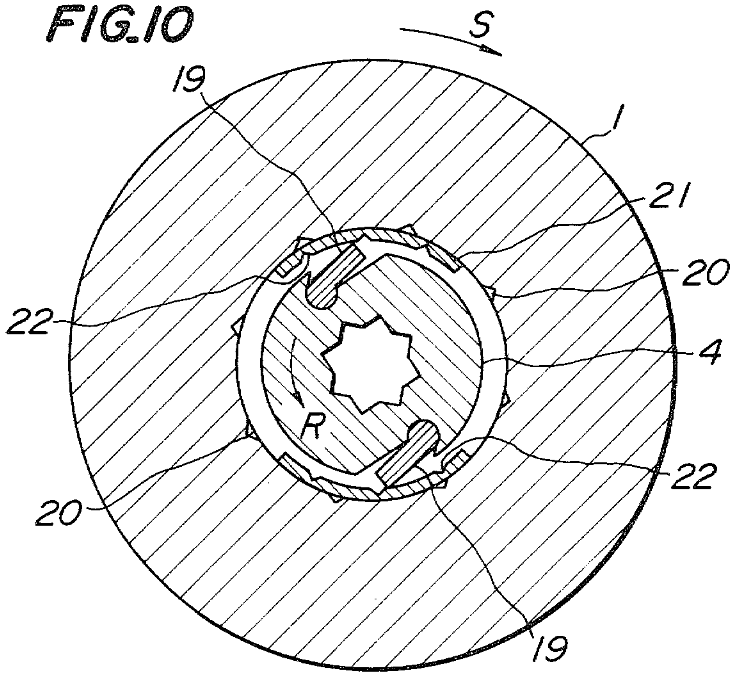

To effect a first stage speed reduction, the handle 6 (not shown) is turned in the counter-clockwise direction. Referring to FIG. 10, as the input shaft 4 turns in the counter-clockwise direction (a direction of the arrow R), the pawls 19 do not engage any of the pawl-engaging grooves 20 and 22, and the direct connection between the input shaft 4 and the drum 1 is removed. Thus, the rotation of the input shaft 4 is transmitted to the gear 8 through the one-way clutch mechanism 9, and this rotation of the gear 8 is transmitted to the drum 1 through the gears 10*a* and 10*b* and the internal gear 11. As a result, the drum 1 is rotated in a clockwise direction (a direction of the arrow S) at a one step reduced speed-change ratio. In this case, the gears 7, 12, and 13 are rotated, but the one-way clutch mechanism 14 prevents such rotation of the gears from disturbing the rotation of the drum 1.

Figure 11:
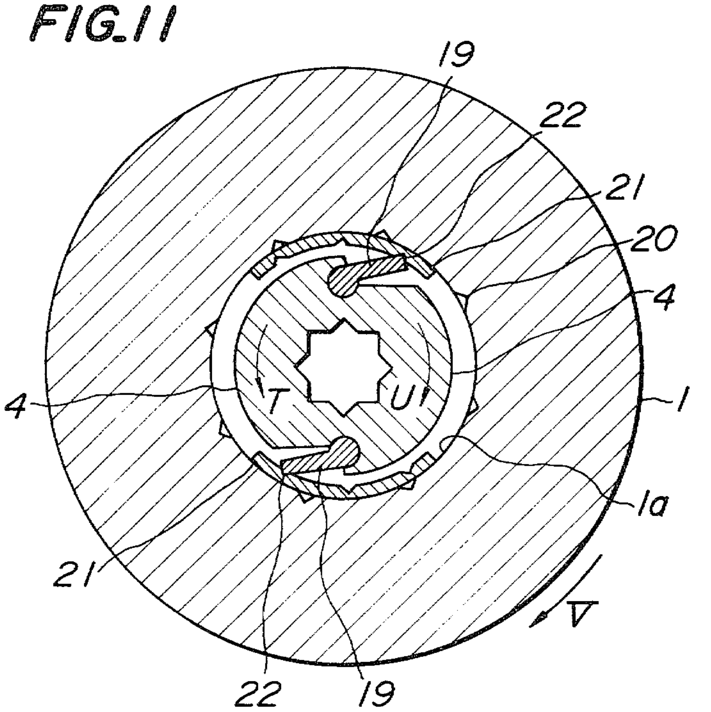

To further reduce the speed-change ratio, the handle 6 (not shown) is at first turned counter-clockwise in a direction of the arrow T of FIG. 11. When the tip ends of the pawls 19 engage suitable ones of the pawl-engaging grooves 22 of the interrupting member 21, the handle 6 (not shown) is turned clockwise (in a direction of the arrow U). Since the interrupting member 21 can rotate relative to the base 2, the interrupting member 21 rotate together with the input shaft 4. Under such conditions, the interrupting member 21 interrupts the pawls 19 from engaging the pawl-engaging grooves 20 on the hole 1*a* of the drum 1, so that the clockwise rotation of the input shaft 4 does not cause the pawls 19 to engage the pawl-engaging grooves 20. As the input shaft 4 rotates clockwise under such conditions, the drum 1 is driven clockwise (in a direction of the arrow V) at a further reduced speed-change ratio as compared with that in the preceding conditions, through the gears 7, 12, 13, 10*a* and 10*b* and the internal gear 11. In this case, the gear 8 also rotates in the opposite direction to the input shaft 4 through the gears 10*b* and 10*a*, but such rotation of the gear 8 is absorbed by the one-way clutch mechanism 9.

To shift the reduced speed-change ratio to the high speed-change ratio, the aforesaid process should be carried out in the opposite order. More particularly, to shift the second stage speed-reduction of FIG. 11 to the first stage speed reduction of FIG. 10, it is sufficient to change the rotation of the handle 6 (not shown) from the clockwise direction (the direction of the arrow U) to the counter-clockwise direction (the direction of the arrow T).

To further shift to the direct connection of FIG. 9, the handle 6 (not shown) is once rotated counterclockwise for moving the pawls 19 to the positions for engaging the pawl-engaging grooves 20 formed on the hole 1*a* of the drum 1, and after the pawls 19 operatively engage the pawl-engaging grooves 20 as shown in FIG. 9, the counterclockwise rotation is ceased and the rotation is turned to clockwise (the direction of the arrow Q).

As described in the foregoing, according to the apparatus of the present invention, the shift of the speed-change ratio can be effected without using any manual changeover mechanism, so that the structure of the apparatus can be kept simple for minimizing faults therein. Besides, three staged speed-change mechanism can be achieved with a minimum number of gear combinations, so that the size of the sheet winch can be reduced and the sheet winch can be manufactured at a low cost.

Furthermore, in the sheet winch having the apparatus of the present invention, acceleration or deceleration can be effected by simple changeover of the rotating direction of the handle. Thus, shifting to a desired speed-change ratio can be achieved by handle operation with one hand only. Accordingly, with the one hand on the handle, the other hand can be freely used for other operations, such as for changing over the sail. Thus, the apparatus of the invention is very convenient.

As another advantage of the presentation, no special handle is required and the handle of the apparatus of the invention can be used in common in other winches of different types.

Although the invention has been described with a certain degree of particularity, it is understood that the present disclosure has been made only by way of example and that numerous changes in details of construction and the combination and arrangement of parts may be resorted to without departing from the scope of the invention as hereinafter claimed.

What is claimed is:

1. A speed-shift apparatus for a sheet winch with multiple speed-change ratio comprising a base;

a drum rotatably supported by a bearing roller disposed between said drum and base;

an input shaft rotatably fitted in said base;

a driving gear secured to a lower portion of said input shaft and a further driving gear operatively connected to the lower end of said input shaft through a one-way clutch mechanism;

a planet gear supported by a side shaft and meshed with said driving gear and an internal gear formed on the inner peripheral surface of the lower end of said drum;

a first intermediate gear meshed with said driving gear and a second intermediate gear coaxially connected to said first intermediate gear meshed with said further driving gear;

a one-way rotation transmitting mechanism having a plurality of pawl means pivotally secured to said input shaft and a pawl-engaging groove means formed on the surface of said winch drum which faces said pawl means so as to allow the drum a one-way rotation by their engaging;

an interrupting member having pawl-engaging portions and being disposed between said drum and said input shaft and being rotatably supported on the top surface of said base and adapted to partially interrupt a space between said pawl means and said pawl-engaging groove means; and a mechanism allowing one-way rotation of said interrupting member relative to a base of said sheet winch, said mechanism including sawteeth formed on the lower bottom surface of said interrupting member and a resiliently biased pin means extending from said base so as to engage said sawteeth.

2. A speed-shift apparatus as defined in claim 1, wherein said pawl means comprises a plurality of pawls pivotally secured to said input shaft and said pawl-engaging groove means includes a plurality of pawl-engaging grooves formed on that surface of said winch drum which faces said pawls.

3. A speed-shift apparatus as defined in claim 2, wherein said pawl-engaging portions of said interrupting member are pawl-engaging grooves formed on that surface of said interrupting member which faces said pawls pivotally secured to said input shaft.

4. A speed-shift apparatus as defined in claim 1, wherein said interrupting member is rotatably supported on top surface of said base of said sheet winch.

5. A speed-shift apparatus as defined in claim 4, wherein said mechanism allowing one-way rotation of said interrupting member includes sawteeth formed on lower bottom surface of said interrupting member and a resiliently biased pin means extending from said base so as to engage said sawteeth.

* * * * *